(12) United States Patent
Dam

(10) Patent No.: US 7,908,931 B1
(45) Date of Patent: Mar. 22, 2011

(54) NON INVASIVE FLOW RATE MEASURING SYSTEM AND METHOD

(75) Inventor: Naim Dam, Muttontown, NY (US)

(73) Assignee: Cosense, Inc., Hauppauge, NY (US)

( * ) Notice: Subject to any disclaimer, the term of this patent is extended or adjusted under 35 U.S.C. 154(b) by 0 days.

(21) Appl. No.: 12/636,865

(22) Filed: Dec. 14, 2009

(51) Int. Cl.
*G01F 1/708* (2006.01)
(52) U.S. Cl. .................................................. 73/861.05
(58) Field of Classification Search ............... 73/861.05, 73/861.95
See application file for complete search history.

(56) References Cited

U.S. PATENT DOCUMENTS 4,938,079 A * 7/1990 Goldberg .................. 73/861.95

\* cited by examiner

*Primary Examiner* — Jewel Thompson
(74) *Attorney, Agent, or Firm* — Gordon D. Coplein

(57) ABSTRACT

A system and method for measuring the flow rate of a liquid in a tube non-invasively has a heating element that generates energy that is applied to the liquid to produce a heat marker that is detected by a temperature sensor located at a known distance from the heating element and the flow rate is calculated from measuring the travel time of the heat marker from the heating element to the sensor. A second temperature sensor measures the ambient temperature of the liquid before the heat marker is produced and detection of the heat marker is made on the basis of the difference between the ambient temperatures and the temperature of the heat marker.

7 Claims, 4 Drawing Sheets

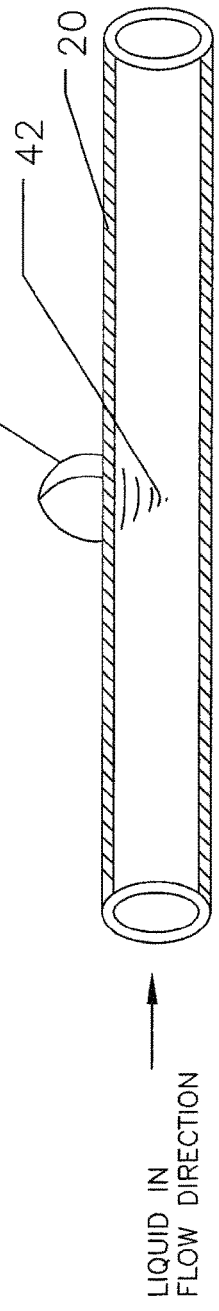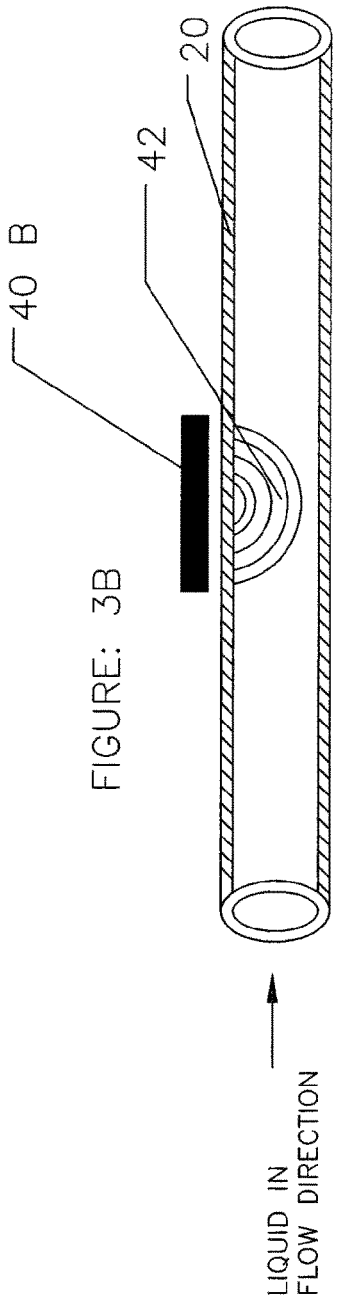

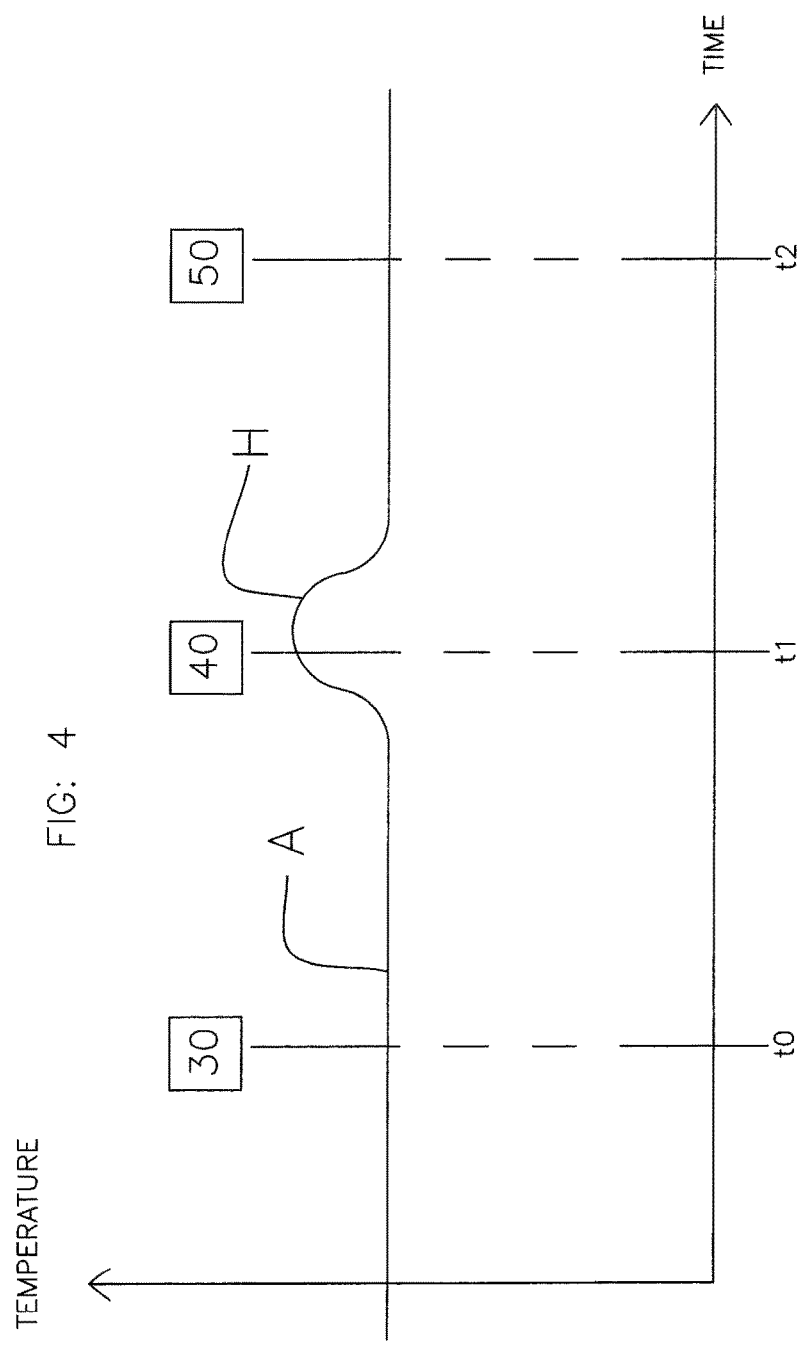
FIG: 4

NON INVASIVE FLOW RATE MEASURING SYSTEM AND METHOD

FIELD OF THE INVENTION

The present invention relates to a system and method for measuring the flow rate of a liquid in a tube non-invasively.

BACKGROUND OF THE INVENTION

Various devices have been used for measuring the rate of flow of the liquid in a tube or pipe. Hereafter the term "tube" is used to include any type of conduit in which a liquid can flow that can be used with the prior art and the invention.

For example, a variety of types of flow measuring devices used in chemical/pharmaceutical industries exist in which contact is made with the liquid as the flow rate measurement is being made. Such devices include a Coriolis flow meter which measures mass flow as a function of gyroscopic torque forces. Devices using this method are complex and expensive. They also have an accuracy of about ±0.4%. Another device is an ultrasonic flow meter which is suited for measuring gallons-per minute flow and whose accuracy is ±0.5%. There also is a continuous heat addition flow meter in which the liquid is heated by a probe immersed in the liquid and the downstream temperature is continuously measured, such as by a thermistor type sensor. In this type of device the accuracy of the measurement varies with the specific heat of the metered liquid and with ambient temperature fluctuations. Also available is a self-heating thermistor placed in contact with the liquid. The thermistor undergoes cooling proportional to the rate of flow of the liquid flowing past it. This type of device is nonlinear and the accuracy of the measurement result varies with the specific heat of the liquid and ambient temperature variations. U.S. Pat. Nos. 5,726,357 and 5,623,097 each disclose a semiconductor substrate on which is integrated a heating element and a heat sensing element. The fluid passes over the heating element and is detected as it passes over the sensing element.

In many applications it is desirable, and even necessary, to measure the liquid flow rate non-invasively, that is, without any part of the measuring device coming into contact with the liquid. This preserves the sterility of the liquid. Applications that require non-invasive measurement include medical devices such as infusion pumps for drug delivery, devices that feed nutrients to patients, and applications in which a disposable tube is used such as in a drug delivery system.

In many applications in which the flow rate is to be measured non-invasively the liquid flow rate is relatively low. Existing devices have difficulty in providing accurate measurement for low flow rate applications. Accurate measurement of low volumetric liquid flow rate is very important in analytical chemistry applications such as chromatography and capillary electrophoresis.

A number of systems exist for measuring liquid flow rate non-invasively. Typical of these is the system described in U.S. Pat. No. 5,764,539, in which a non-invasive temperature sensor is heated to a predetermined temperature which changes as the liquid passes by it. The temperature change is determined to detect the characteristics of the liquid and whether or not the liquid is flowing. In U.S. Pat. No. 4,938,079 a resonant microwave cavity provides heat markers in the flowing liquid which are detected by another resonant cavity based on the perturbations of the liquid by the heat markers.

In U.S. Pat. No. 6,582,393 an amount of liquid to be used as a medicinal dose is held in a chamber in an elastic tube formed by a pinch bar engaging the tube. The dose amount of liquid is heated by a heating block and is then released by releasing the pinch bar. The heated liquid dose is sensed by a heat sensor block and the travel time of the dose between the heating and sensing blocks is computed to give the dose flow rate. This information is used to maintain or correct the time of application of further doses of the liquid to achieve a predetermined dose rate.

In U.S. Pat. Nos. 6,932,796 and 7,268,859 and U.S. patent publication 2005/0005710 a tube a heating element heats liquid flowing in a tube to form a heat marker that is optically detected. The travel time of the heat maker between the heating element and the optical detector is used to compute the flow rate. The optical detectors used in the systems of these patents and patent publication do not actually determine the temperature of the heat marker and the configuration of the optical detector is relatively complex.

All of the existing non-invasive liquid flow rate measure devices and systems are relatively complex and relatively expensive. Accordingly, a need exists to provide a system and method that can measure flow rates non-invasively, with such system being easy to operate, providing accurate results even for low volume flow rates and being of a relatively low cost.

BRIEF DESCRIPTION OF THE INVENTION

In accordance with the invention a system and method is provided for measuring liquid flow rates non-invasively. In the invention a housing is provided in which is mounted a heat producing element and a temperature sensor that is downstream of the heat producing element in the direction of the liquid flow. The heat producing element applies a heat pulse marker to the liquid flowing in a tube placed in the housing. In a typical medical application the tube would be of an elastic plastic material and would be disposable.

The heating element can be, for example, a focused pulsed beam of ultrasonic energy of an intensity sufficient to produce the desired quantity of heat for the heat marker or by a laser diode or any semiconductor heating element. The liquid absorbs the energy from the heating element and is heated in a small area that serves as a heat marker. The temperature sensor, such as an infrared (IR) type heat sensor, is spaced at a known fixed distance from the heating element. The temperature sensor senses the heat marker in the flowing liquid. An electronic circuit is coupled to both the heating element and the temperature sensor. The electronic circuit controls the time of production of the pulse of energy supplied to the flowing liquid to form the heat marker. It also determines the time at which the heat marker in the flowing liquid passes by the temperature sensor. Since the distance between the heating element and temperature sensor is known, the flow rate can be computed from the measured transit time of the heat marker traveling over the known fixed distance.

In a preferred embodiment of the invention a second temperature sensor is placed upstream of the heating element. The second temperature sensor measures the temperature of the liquid to provide a baseline value against which the temperature of the heat marker sensed by the first temperature sensor is compared. In this manner, the system is self-regulating since detection of the heat marker can be set to be recognized at a predetermined temperature difference between the liquid before heating and the temperature of the heat marker. It also preserves the accuracy of the system when the ambient temperature of the environment in which the tube is located changes or a liquid of a different temperature is provided to flow through the tube.

BRIEF DESCRIPTION OF THE DRAWINGS

Other objects and advantages of the present invention will become more apparent upon reference to the following specification and annexed drawings in which:

FIGS. 3A and 3B show partly in cross section different types of heating elements; and FIG. 4 is a timing diagram showing the heat marker traveling in the liquid.

DETAILED DESCRIPTION OF THE INVENTION

Figure 1:
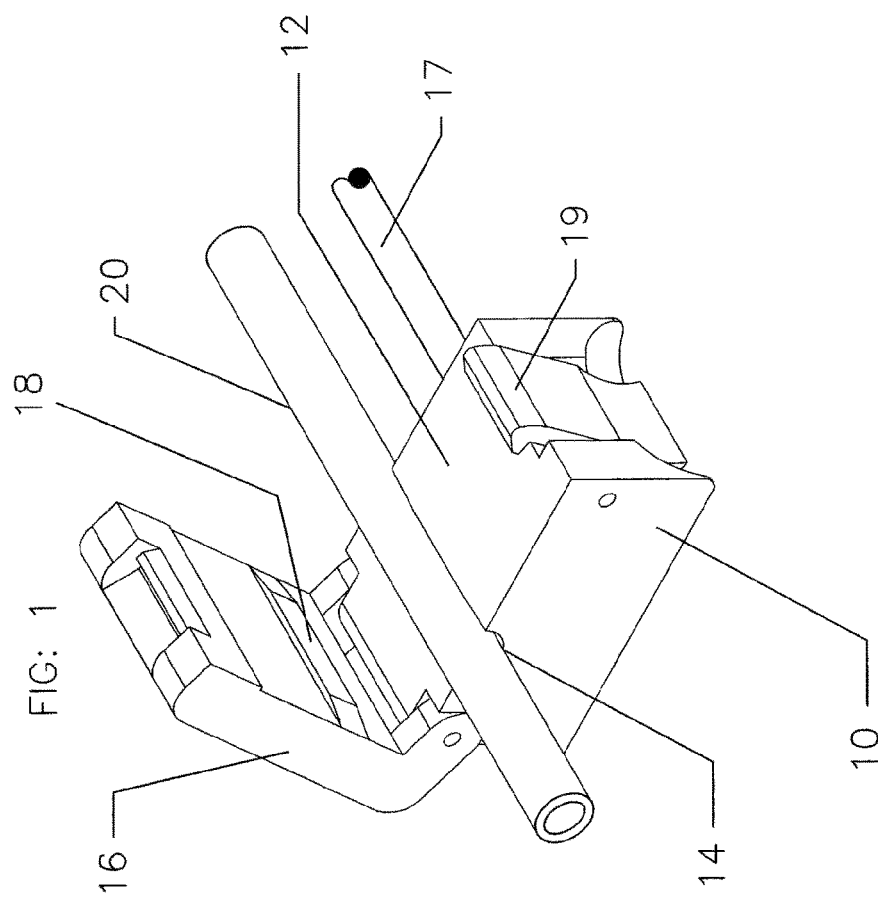
FIG. 1 is a perspective view of a housing for the flow rate detection system and method of the invention.

FIG. 1 shows a housing 10 that can be made of any suitable material, such as plastic. The housing 10 is illustratively shown as being of a generally rectangular shape although it can have any desired shape. The housing 10 includes a base 12 having a slot 14 that is generally semi-circular in shape, and that extends across the base width. The slot 14 holds a tube 20 in which a liquid flows. The tube 20 can be of any material including plastic, glass, ceramic, or metal. A tube of plastic material works best with the invention since the energy that is applied to the tube to produce the heat marker in the flowing liquid will be dissipated in the tube wall material. If the tube 20 is of plastic, it can be of either a hard material or a compressible material. The tube wall can have any thickness, which will be accommodated for by the magnitude of the energy that is generated to be applied through the tube wall to the liquid to produce the heat marker.

Housing 10 as shown has a hinged cover 16 that has a slot 18 across its width to overlie the tube. A cable 17 extends from the base 12. The cable has the necessary wires to connect the temperature sensors and heating elements that are located in the base to external circuitry that is used in providing power to the components and for measuring the flow rate. The cover 16 has a latching mechanism 19 that holds the cover to the base 12. When the cover 16 is closed the tube 20 is held between the slots 14 and 18. The housing 10 and slots 14 and 18 can of any desired size and shape to accommodate the type and size of the tube in which the liquid flow rate is being measured.

Figure 2:
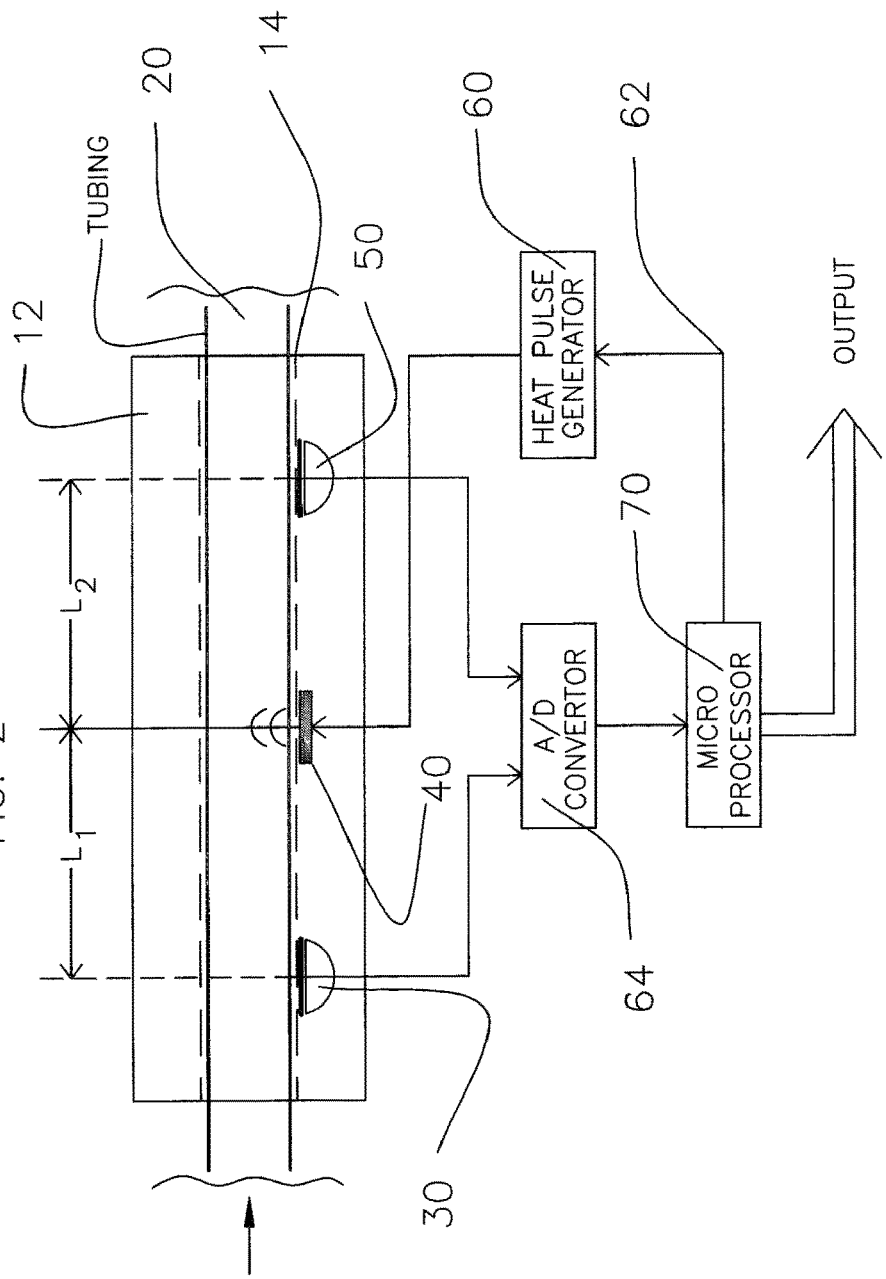
FIG. 2 is a top plan view of a part of the housing of FIG. 1 and also a schematic block diagram of the electronic circuit portion of the system.

FIG. 2 shows details of the base part 12 of the housing 10 in which a tube 20 is placed in the slot 14 with liquid flowing in the tube from left (upstream) to right (downstream), as shown in the drawing. Going from the upstream (source) direction of the liquid flow in the tube there are a first temperature sensor 30, a heating element 40 and a second temperature sensor 50. These components are described in detail below. The components 30, 40, 50 are in one wall of the part of the base 12 in which the slot 14 is formed. The components can be molded into the wall if the base is molded or inserted into cavities made in the base to hold the components with the faces component faces that oppose the tube 12 being sealed by a suitable plastic such as an epoxy. The thickness of the seal is typically 0.015 inches (0.38 mm) to 0.030 inches (0.76 mm). This has the advantage of not subjecting the components to dirt or moisture, thereby minimizing component failure and eliminating cleaning problems.

I the placement of the components 30, 40 50 the second temperature sensor 50 is spaced from the heating element 40 by a known fixed distance designated as "L" which is a factor used in computing the liquid flow rate. The spacing between the first temperature sensor 30 and the heating element 40 is not critical but, in a preferred embodiment of the invention, it is also made the distance L for convenience in computation.

In the preferred embodiment of the invention, the temperature sensors 30 and 50 are infrared (IR) IR heat detectors. Suitable IR heat detectors for use are Melexis—series MLX90614 obtained from Melexis, Inc. of Concord N.H. These IR detectors have a programmable response time, small size (miniature package To −39) and are of relatively low cost.

A heat pulse generator 60 that is external to the sensor base 12 supplies the required power to the heating element 40 to generate a pulse of energy to be transmitted through the wall of tube 20 to be applied to the liquid to heat it and form a heat marker. The timing of the application and the duration of the heat pulses is controlled by a microprocessor 70. The heat pulse generator and microprocessor, as well as all other electronic components can be within or external of the housing 10 as desired.

FIGS. 3A and 3B show different types of heating elements 40. In FIG. 3A the heating element is an ultrasonic transducer 40A that receives voltage from the heat pulse generator 60 and converts the voltage into electro-mechanical (ultrasonic) energy. The transducer 40A preferably is of the type whose output energy can be focused to concentrate the energy at a fixed point in the liquid flowing in the tube. The energy pulse from the transducer 40A passes though the tube wall, as indicated by the curved lines 42, and is absorbed by the liquid to produce a heat bolus, or mass, that serves as the heat marker. The transducer 40A would normally engage the wall of the tube 20 and would have sufficient power supplied by the generator 60 with the power requirements being determined by the type of tube material and the tube wall thickness. Different types of liquids have different heat absorption factors to different ultrasonic energy frequencies. Therefore, the frequency of the ultrasonic energy is selected so that the maximum amount of heat will be absorbed by the liquid in the tube.

Aa a typical example, the tube 20 being of an elastic plastic material such as:

a) PVC inside diameter 0.20" (5.0 mm) with wall thickness 0.065" (1.65 mm)

b) PVC inside diameter 0.5" (12.7 mm) with wall thickness of 0.1" (0.25 mm)

c) PVC inside diameter 0.125" (3.18 mm) with wall thickness of 0.030 (0.76 mm)

d) Same as above but Teflon material.

The PVC and TEFLON can be either flexible or rigid tubing.

Using the above types of tubing an ultrasonic transducer that would produce about one watt of energy at a frequency of about 1 MHZ for about 10 microseconds would produce a heat marker H of about 7° C. in excess of a liquid at an ambient temperature of 22° C. That is, the heat marker would be at 29° C.

The above examples are not to be considered a limiting since the invention can be used with tubing of other sizes and materials with suitable selection, placement and operation of the components 30, 40, 50. For example, a higher wattage and/or longer duration and/or different frequency ultrasonic pulse would be used with plastic tubing having thicker walls than those shown above.

In FIG. 3B the heating element 40B is a laser diode that is suitably powered by the heat pulse generator 60. When a laser diode is used, the laser wavelength output can be selected to maximize the heat absorption by the liquid. In a preferred embodiment of the invention, a laser diode is used having an output near about 1550 nm wave length. At this wave length the heat absorption coefficient of water and many other liquids is relatively high. Such a laser diode is relatively inexpensive and is commercially available. See, for example, Newport Corporation Spectra Physics Division (Santa Clara, Calif.) Model ML 925B45F. The light output energy 42 from the laser diode can be focused directly from the diode or through an optical system (not shown) to be concentrated for application into a selected point of the flowing liquid.

Using either the ultrasonic transducer 40A of FIG. 3A, or the laser diode 40B of FIG. 3B, or any other suitable type of heating element, the size of the heating element and the output of the pulse generator 60 are selected to produce the desired size of heat marker bolus that flows in the liquid. Other forms of heating elements also can be used in such as ????

In the operation of the system the ambient, or normal, temperature of the liquid is measured by the first temperature sensor 30. The heat marker in the liquid is sensed as it flows past the second temperature sensor 50. FIG. 4 shows a diagram of temperature versus time in which the liquid shown in line A flows past the first temperature sensor 30 at the time t0. At time t1 a heat pulse marker, or bolus, H is applied to the liquid in the tube as explained above. The heat marker H then flows past and is detected by the second temperature sensor 50 at time t2. The second temperature sensor 50 is located at the fixed distance L from the heating element 40.

Measurement of the time of transit of the heat marker H over the fixed distance L gives the liquid flow rate in accordance with the following:

$$Q = A \times L / t_d \text{ where}$$

Q=Flow rate
A=Cross sectional area of the tube
L=Distance between heating element 40 and temperature sensor 50
$t_d$=average transit time less the time lost due to the response of tube material in the heat detector. That is:

$$td = t_m - t_t - t_l, \text{ where}$$

$t_m$=multiple time measurements
$t_t$=Calculated delay in tubing due to thermal time constant associated with plastic tubing
$t_l$=Response time of heat detector.

The time $t_d$ is known in advance and is programmed into the microprocessor 70. Since all of tm, tt and tl are known the value td is calculated. Since A and L also are known, the flow rate Q is calculated by the microprocessor.

In the components of the electronic circuit, as shown in FIG. 2, the microprocessor 70 is programmed with the values A, D, $t_t$ and $t_l$. The outputs of the temperature sensors 30 and 50 are connected to an analog to digital (A/D) converter 64 that converts the measured temperature into digital format. Some temperature sensors include this function so that the A/D converter might not be needed. The microprocessor 70 produces a timing signal on line 62 to cause the heat pulse energy generator 60 to produce an output that is applied to the heating element 40. The timing signal also starts a transit time period, compensated by the various delay factors discussed above, that is ended by the detection of the heat pulse by the second temperature sensor 50. The microprocessor calculates the flow rate Q from the measured transit time period using the formulas discussed above. The measured flow rate calculated by the microprocessor can be of any required dimensional quantity, e.g. cc/min, cc/hr or any other unit. This is the microprocessor output which can be displayed by a suitable display device located on the housing 10 or output to a display remote from the housing. The calculated flow rate data can be supplied from the microprocessor output to another device to be used for flow rate control or any other purpose.

The microprocessor 60 is preferably programmed to make multiple measurements of the transit time td of the heat pulse from the heating element 40 to the second temperature sensor 50 and from these multiple measurements calculate the value tm. The microprocessor also can be programmed to perform as many calculations of Q over a predetermined period of time as desired, to average the calculations of Q, to take a maximum or some other value of Q from a group of measurements, etc.

Using the two temperature sensors 30 and 50 has an advantage in that common mode temperature changes can be eliminated. That is, the ambient (before heat pulse is applied) temperature of the liquid is measured by the first temperature sensor 30 and is used as a base line value by the microprocessor. The microprocessor 70 is programmed to respond to detection of a heat pulse marker H at a predetermined temperature, for example ?? degrees above the base line value. Therefore, if the ambient temperature of the liquid varies either up or down it will have no effect on the accuracy of the flow rate measurement since the base line value varies in this manner. The same advantageous effect is obtained if a different liquid having a different ambient temperature is substituted.

The system of the invention has numerous advantages. It is completely non-invasive so that it can be used in applications where sterility of the liquid is required. It has high measurement accuracy with a fast response time. Further, different sizes of the tube can be accommodated by the housing 10 such as tube diameters of from 1 mm to 15 mm diameter. The tubes can be of the disposable type. Also, the system can accommodate tubes of different types of plastic material. The system also can be used for measuring liquid flow rate in glass/metal tubing.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. A system for measuring the flow rate of liquid flowing in a tube comprising:
    a heating element adjacent the tube to apply a pulse of energy to the flowing liquid to form a heat marker;
    a first temperature sensor positioned upstream of said heating element to detect the temperature of the liquid before the pulse of heating energy is applied to the liquid;
    a second temperature sensor located at a fixed known distance downstream from said heating element for sensing the temperature of said heat maker in the flowing liquid; and
    an electronic circuit that detects a usable heat marker on the basis of a pre-determined difference in temperature between the temperatures measured by said first temperature sensor and said second temperature sensor, and computes the liquid flow rate based on the time between the application of the said usable heat marker to the flowing liquid and the sensing of the detected useable heat marker by said second temperature sensor.

2. The system as claimed in claim 1 wherein each of said first and second temperature sensors is an infrared detector.

3. The system as claimed in claim 2 wherein said heating element is a transducer that produces electro-mechanical energy applied to the liquid.

4. The system as claimed in claim 2 wherein said heating element is a laser that produces light that is applied to the liquid.

5. The system as claimed in claim 1 wherein said electronic circuit further operates to calculate the liquid flow rate using a known value of the time delay of forming the heat marker in the liquid after the energy is applied by said heating element due to the material of the tube.

6. A method for measuring the flow rate of a liquid in a tube comprising the steps of:

providing a pulse of energy from a heating element to the liquid flowing in a tube to form a heat marker in the flowing liquid;

detecting the ambient temperature of the liquid by a first temperature sensor located upstream of said heating element;

detecting a usable heat maker by a second temperature sensor located at a fixed known distance downstream from said heating element on the basis of a predetermined difference between the ambient temperature measured by said first temperature sensor and the temperature of the heat marker; and computing the flow rate of the liquid based on measuring the transit time of the said usable heat marker between said heating element and said sensor.

7. The method as claimed in claim 6 wherein the ambient temperature and the heat marker temperature are measured by infrared temperature sensors.

* * * * *